(12) United States Patent
Shin et al.

(10) Patent No.: US 9,575,375 B2
(45) Date of Patent: Feb. 21, 2017

(54) LIQUID-CRYSTAL DISPLAY HAVING SLITS IN ELECTRODES TO INCREASE APERTURE RATIO AND IMPROVE TRANSMITTANCE

(71) Applicant: Samsung Display Co., Ltd., Yongin, Gyeonggi-Do (KR)

(72) Inventors: Cheol Shin, Yongin (KR); Haksun Chang, Yongin (KR); Kaeun Kim, Yongin (KR); Kichul Shin, Yongin (KR); Hokil Oh, Yongin (KR); Sehyun Lee, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 192 days.

(21) Appl. No.: 14/609,000

(22) Filed: Jan. 29, 2015

(65) Prior Publication Data
US 2016/0048062 A1    Feb. 18, 2016

(30) Foreign Application Priority Data
Aug. 18, 2014  (KR) .................. 10-2014-0106955

(51) Int. Cl.
*H01L 29/423*    (2006.01)
*G02F 1/1368*    (2006.01)
(Continued)

(52) U.S. Cl.
CPC ... *G02F 1/134336* (2013.01); *G02F 1/133707* (2013.01); *G02F 2001/134318* (2013.01);
(Continued)

(58) Field of Classification Search
CPC .............. G09G 2300/0439; G09G 3/3659; H01L 23/49534; H01L 27/124; H01L 27/3276; H01L 27/3279; H01L 27/3297; H01L 2933/0016; H01L 27/329
See application file for complete search history.

(56) References Cited

U.S. PATENT DOCUMENTS

2003/0193625 A1 * 10/2003 Yoshida .............. G02F 1/1393
                                                          349/43
2009/0002588 A1 *  1/2009 Lee ................. G02F 1/133707
                                                          349/42
(Continued)

FOREIGN PATENT DOCUMENTS

KR   10-2009-0129774 A   12/2009
KR   10-2010-0103091 A    9/2010
KR     1020150060445 A    6/2015

*Primary Examiner* — Tracie Y Green
(74) *Attorney, Agent, or Firm* — Robert E. Bushnell, Esq.

(57) ABSTRACT

Provided is a liquid-crystal display (LCD) device. The LCD device includes: one pair of substrates; and a pixel electrode and a common electrode that are provided on the one pair of substrates to respectively face each other, wherein the pixel electrode includes: one pair of plate electrodes in which a horizontal slit and a plurality of first vertical slits that cross the horizontal slit are formed and that are divided by the horizontal slit and surround both sides of a cross pattern formed by the horizontal slit and the plurality of first vertical slits; and a plurality of fine branch electrodes that are obliquely formed to be connected to the plate electrode at a portion of the cross pattern including a point at which the horizontal slit and the first vertical slit cross each other, wherein one pixel region includes a first subpixel area and a second subpixel area that are divided by the horizontal slit.

13 Claims, 7 Drawing Sheets

(51) Int. Cl.
   *G02F 1/1343*   (2006.01)
   *G02F 1/1337*   (2006.01)
(52) U.S. Cl.
   CPC ............ *G02F 2001/134345* (2013.01); *G02F 2201/40* (2013.01)

(56) References Cited

U.S. PATENT DOCUMENTS

| | | |
|---|---|---|
| 2009/0310075 A1 | 12/2009 | Kim |
| 2010/0231845 A1 | 9/2010 | Seong et al. |
| 2013/0107185 A1 | 5/2013 | Chen et al. |
| 2015/0146126 A1 | 5/2015 | Shin et al. |
| 2016/0246089 A1* | 8/2016 | Jeong .................... G02F 1/1368 |

* cited by examiner

LIQUID-CRYSTAL DISPLAY HAVING SLITS IN ELECTRODES TO INCREASE APERTURE RATIO AND IMPROVE TRANSMITTANCE

CLAIM OF PRIORITY

This application claims the priority of and all the benefits accruing under 35 U.S.C. §119 of Korean Patent Application No. 10-2014-0106955, filed on Aug. 18, 2014, in the Korean Intellectual Property Office ("KIPO"), the disclosure of which is incorporated herein in its entirety by reference.

BACKGROUND OF THE INVENTION

Field of the Invention

One or more embodiments of the present invention relate to a liquid-crystal display (LCD) device, and more particularly, to an LCD device that may increase a transmittance.

Description of the Related Art

Displays are used in various applications including computer monitors, televisions, mobile phones, or portable terminals. Liquid-crystal display (LCD) devices and organic light-emitting displays are most common flat panel displays.

An LCD device that is one of most common flat panel displays includes two plates on which a pixel electrode and a common electrode are formed and a liquid-crystal layer that is disposed between the two plates, and displays an image by applying a voltage to the pixel electrode or the common electrode to produce an electric field in the liquid-crystal layer and by changing an arrangement of liquid-crystal molecules of the liquid-crystal layer to control polarization of light that passes through the liquid-crystal layer.

Among LCD devices, there is a vertical alignment (VA) LCD device in which major axes of liquid-crystal molecules are aligned perpendicular to a display plate when no electric field is applied. Among (VA) LCD devices, a patterned vertical alignment (PVA) LCD device that is developed to have a wide viewing angle forms fine slits in patterned transparent electrode so that liquid crystals are aligned in different directions due to an electric field that is produced between the patterned transparent electrodes.

An LCD device using a method of dividing one pixel into two subpixels and applying different voltages to the two subpixels has a structure in which a switching driver is disposed between the two subpixels. The LCD device has a low aperture ratio and a low transmittance because a ratio of an area occupied by the switching driver to a total area is relatively high.

SUMMARY OF THE INVENTION

One or more embodiments of the present invention include a liquid-crystal display (LCD) device that may increase an aperture ratio and a transmittance.

Additional aspects will be set forth in part in the description which follows and, in part, will be apparent from the description, or may be learned by practice of the presented embodiments.

According to one or more embodiments of the present invention, an LCD device includes: one pair of substrates; and a pixel electrode and a common electrode that are provided on the one pair of substrates to respectively face each other, wherein the pixel electrode includes: one pair of plate electrodes in which a horizontal slit and a plurality of first vertical slits that cross the horizontal slit are formed and that are divided by the horizontal slit and surround both sides of a cross pattern formed by the horizontal slit and the plurality of first vertical slits; and a plurality of fine branch electrodes that are obliquely formed to be connected to the one pair of plate electrodes at a portion of the cross pattern including a point at which the horizontal slit and the plurality of first vertical slits cross each other, wherein one pixel region includes a first subpixel area and a second subpixel area that are divided by the horizontal slit.

The LCD device may further include: a plurality of second vertical slits that extend from edges of the pixel region along the horizontal slit alternate with the plurality of first vertical slits; and a plurality of second fine branch electrodes that are obliquely formed to be connected to the one pair of whole electrodes at a portion including a point at which the edges of the pixel region and the plurality of second vertical slits meet each other.

An end of the second vertical slit may be spaced apart from the horizontal slit so that portions of the one pair of plate electrodes that respectively belong to the first subpixel area and the second subpixel area are connected to each other.

A partial extension structure of the plate electrode may be formed in at least a portion of a boundary between the plate electrode and at least one of the plurality of first fine branch electrodes and the plurality of second fine branch electrodes.

A partial extension structure of the plate electrode may be formed in at least a portion of a boundary between the plate electrode and the plurality of first fine branch electrodes.

The partial extension structure of the plate electrode may be formed by partially extending the plate electrode in a shape of a stepping stone.

One or more slits may be formed in at least one area where the plate electrode is partially extended in the shape of the stepping stone.

The common electrode may include a slit pattern that is formed to have a width less than a width of the plate electrode at a position corresponding to the plate electrode.

The slit patterns may be formed to surround the plurality of first fine branch electrodes and portion of the cross pattern including a point at which the horizontal slit and the first vertical slit cross each other.

The slit pattern may be formed so that inner electrode portions of the slit patterns have trapezoidal shapes.

The slit pattern may be formed to have a portion having a different width.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

The present invention will now be described more fully with reference to the accompanying drawings, in which exemplary embodiments of the invention are shown. The advantages and features of the present invention and methods of achieving the advantages and features will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art.

The present invention will become more apparent to one of ordinary skill in the art by describing in detail exemplary embodiments thereof with reference to the accompanying drawings. In the drawings, the same elements are denoted by the same reference numerals and a repeated explanation thereof will not be given.

It will be understood that although the terms "first", "second", etc. may be used herein to describe various elements, these elements should not be limited by these terms. These elements are only used to distinguish one element from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or element is referred to as being "formed on," another layer, region, or element, it can be directly or indirectly formed on the other layer, region, or element. That is, for example, intervening layers, regions, or elements may be present.

Sizes of elements may be exaggerated for convenience of explanation. In other words, since sizes and thicknesses of elements in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

Figure 1:
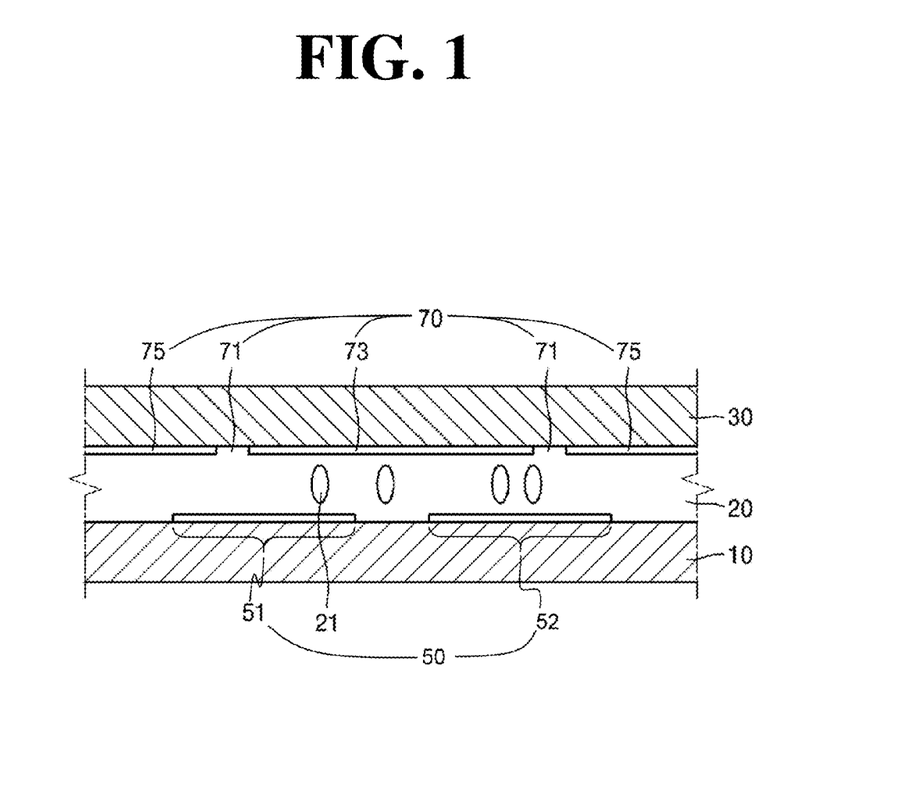
FIG. 1 is a cross-sectional view illustrating a liquid-crystal display (LCD) device according to an embodiment of the present invention.
Figure 2:
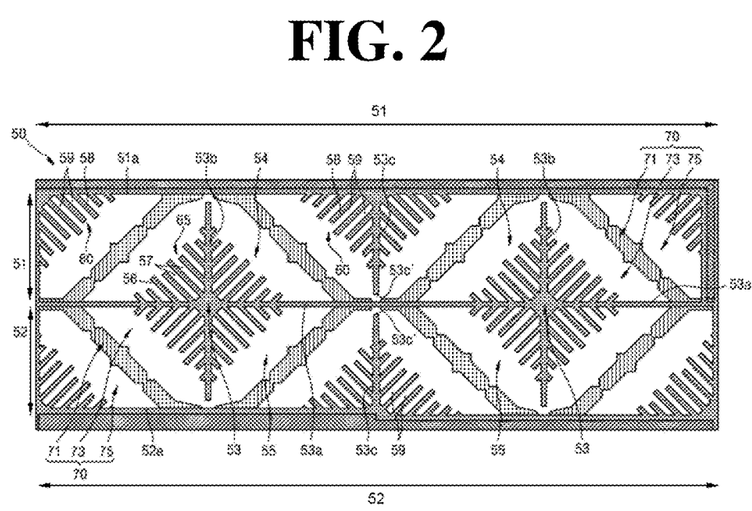
FIG. 2 is a view illustrating an electrode structure of the LCD device, according to an embodiment of the present invention.
Figure 3:
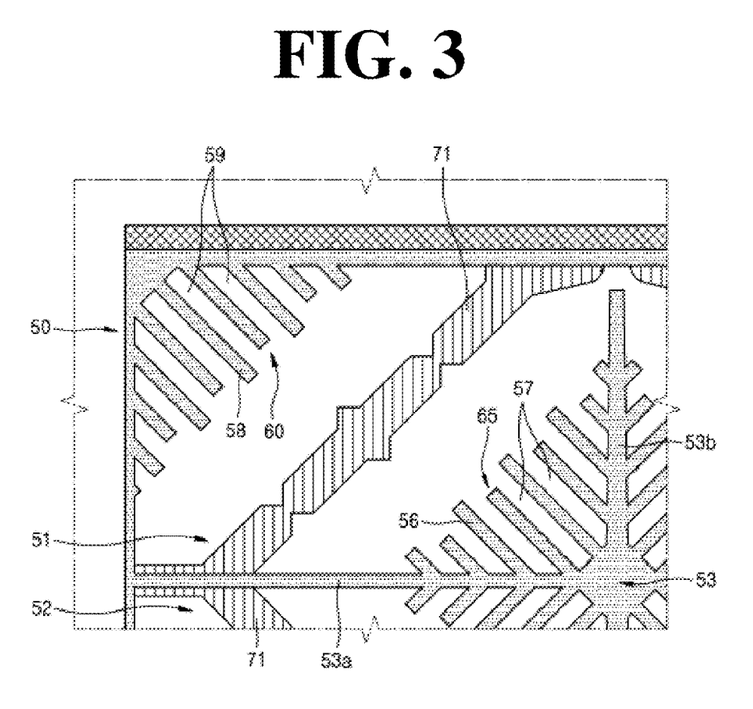
FIG. 3 is a partial enlarged view of FIG. 2.

FIG. 1 is a cross-sectional view illustrating a liquid-crystal display (LCD) device according to an embodiment of the present invention. FIG. 2 is a view illustrating an electrode structure of the LCD device according to an embodiment of the present invention. FIG. 3 is a partial enlarged view of FIG. 2.

Referring to FIGS. 1 through 3, the LCD device includes a first substrate and a second substrate, for example, a lower substrate 10 and an upper substrate 30, and a liquid-crystal layer 20 that is disposed between the lower substrate 10 and the upper substrate 30.

Each of the lower substrate 10 and the upper substrate 30 may be an insulating substrate formed of glass or plastic. Alignment films (not shown) may be formed on inner surfaces of the lower substrate 10 and the upper substrate 30, and the alignment films may be vertical alignment (VA) films. Two polarizers (not shown) may be respectively provided on outer surfaces of the lower substrate 10 and the upper substrate 30. In this case, axes of transmission of the polarizers may be perpendicular to each other. The LCD device of the present embodiment may be reflective, and in this case, a polarizer (not shown) may be disposed on only a light emission surface, for example, the outer surface of the upper substrate 30.

The liquid-crystal layer 20 may be configured to be a VA mode in which major axes of molecules of liquid crystals 21 are aligned perpendicular to the lower substrate 10 and the upper substrate 30 when no electric field is applied, and may be configured to be a patterned vertical alignment (PVA) mode in which electrodes are patterned. The liquid crystals 21 of the liquid-crystal layer 20 may have, for example, negative dielectric anisotropy. When the two polarizers are disposed on the outer surfaces of the lower substrate 10 and the upper substrate 30 to be perpendicular to each other, light that passes through one of the two polarizers does not pass through and is blocked by the other (e.g., an analyzer) of the two polarizers when no electric field is applied to the liquid-crystal layer 20.

For example, a pixel electrode 50 may be provided on the lower substrate 10 and a common electrode 70 may be provided on the upper substrate 30. Although the pixel electrode 50 is provided on the lower substrate 10 and the common electrode 70 is provided on the upper substrate 30 for convenience of explanation, the present embodiment is not limited thereto. Also, although the terms 'lower substrate' and 'upper substrate' are used for convenience of explanation, the present embodiment is not limited to the concept that the lower substrate 10 is disposed under the upper substrate 30 and may encompass the concept that the lower substrate is disposed behind the upper substrate 30 in an observer's point of view.

Figure 4:
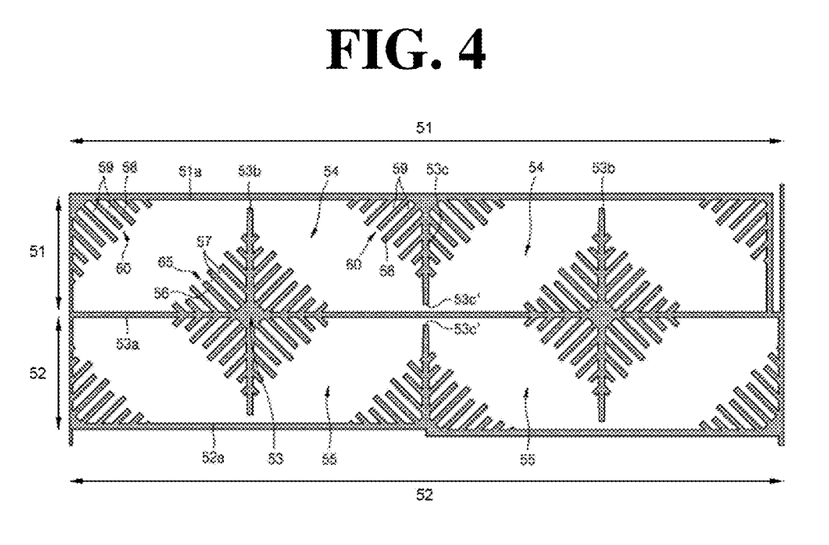
FIG. 4 is a view illustrating only a pixel electrode of FIG. 2.
Figure 5:
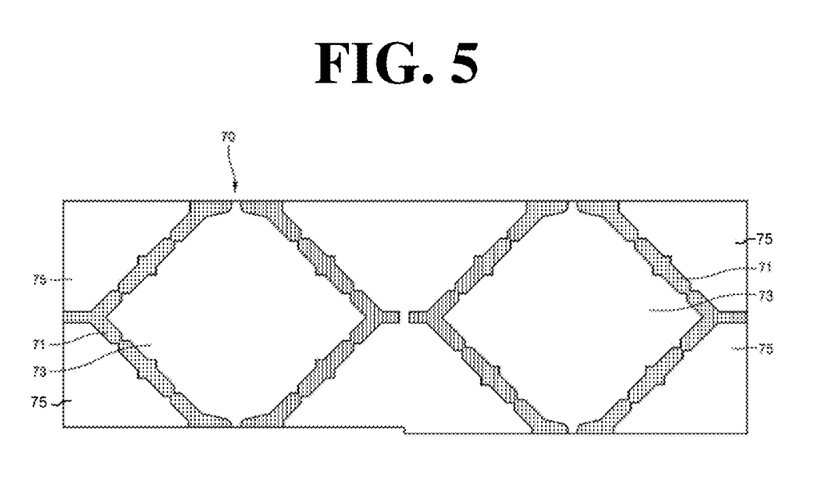
FIG. 5 is a view illustrating only a common electrode of FIG. 2.

FIGS. 2 and 3 illustrate states where the common electrode 70 that is provided on the upper substrate 30 overlaps the pixel electrode 50 that is provided on the lower substrate 10. FIG. 4 is a view illustrating only the pixel electrode 50 of FIG. 2 and FIG. 5 is a view illustrating only the common electrode 70 of FIG. 2.

Referring to FIGS. 2 through 4, in the LCD device of the present embodiment, a horizontal slit 53a and a plurality of first vertical slits 53b that cross the horizontal slit 53a at a plurality of positions are formed in the pixel electrode 50. The pixel electrode 50 includes one pair of plate electrodes 54 and 55 that are divided by the horizontal slit 53a and surround both sides of a cross pattern 53 formed by the horizontal slit 53a and the first vertical slit 53b, and a plurality of first fine branch electrodes 57 that are obliquely formed to be connected to the plate electrodes 54 and 55 at a portion of the cross pattern 53 including a point at which the horizontal slit 53a and the first vertical slit 53b cross each other. One pixel area is divided into a first subpixel area 51 and a second subpixel area 52 by the horizontal slit 53a.

That is, a plurality of the cross patterns 53 are formed in the pixel electrode 50, and are connected to each other by the horizontal slit 53a so that one pixel area includes the first subpixel area 51 and the second subpixel area 52 that are divided by the horizontal slit 53a. The pixel electrode 50 includes the two plate electrodes 54 and 55 that surround both sides of each of the cross patterns 53 and the plurality of first fine branch electrodes 57 that obliquely extend toward the cross pattern 53 from the plate electrodes 54 and 55. That is, since the cross pattern 53 is formed to be a slit cross pattern, the plurality of first fine branch electrodes 57 that are obliquely connected to the plate electrodes 54 and 55 may be formed.

The cross pattern 53 that is formed when the horizontal slit 53a and the first vertical slit 53b cross each other may be empty or may be filled with a material, for example, an insulating material, other than an electrode material.

In the pixel electrode 50, a plurality of second vertical slits 53c that extend from edges of the pixel area along the horizontal slit 53a, that is, an edge 51a of the first subpixel area 51 along the horizontal slit 53a and an edge 52a of the second subpixel area 52 along the horizontal slit 53a, may be formed to alternate with the first vertical slits 53b. Also, a plurality of second fine branch electrodes 59 that are obliquely formed to be connected to the plate electrodes 54 and 55 at a portion including a point at which the edges of the pixel area, that is, the edge 51a of the first subpixel area 51 and the edge 52a of the second subpixel area 52 and the second vertical slits 53c, meet each other may be further formed.

In this case, ends 53c' of the second vertical slits 53c may be departed from the horizontal slit 53a so that portions of the plate electrodes 54 belonging to the first subpixel area 51 are connected to each other and portions of the plate electrodes 55 belonging to the second subpixel area 52 are connected to each other.

That is, the plurality of first fine branch electrodes 57 may extend to inner portions of the plate electrodes 54 and 55 to reach the cross pattern 53, and the plurality of second fine branch electrodes 59 may extend to outer portions of the plate electrodes 54 and 55 from the cross pattern 53.

For example, since the plurality of cross patterns 53 that are departed from each other along the horizontal slit 53a that divides the first subpixel area 51 and the second subpixel area 52 are formed and a plurality of slits 56 are obliquely formed in each of the cross patterns 53 to form a slit cross pattern, the pixel electrode 50 may include the plurality of first fine branch electrodes 57 that obliquely extend to the inner portions of the plate electrodes 54 and 55 that surround the cross pattern 53 to reach the cross pattern 53. Also, since the plurality of second vertical slits 53c that extend from the edges of the pixel area along the horizontal slit 53a are formed to alternate with the plurality of first vertical slits 53b of the cross patterns 53 and a plurality of slits 58 are obliquely formed at a portion including a point at which the edges of the pixel area and the second vertical slits 53c meet each other, the plurality of second fine branch electrodes 59 may be obliquely formed to be connected to the plate electrodes 54 and 55.

Since the first fine branch electrodes 57 and the second fine branch electrodes 59 are formed as described above, portions of the plate electrodes 54 and 55 that surround the cross pattern 53 may have a substantially trapezoidal shape, and since the ends 53c' of the second vertical slits 53c and the horizontal slit 53a are departed from each other, portions of the plate electrodes 54 and 55 belonging to the first subpixel area 51 and the second subpixel area 52 may be connected to each other.

Partial extension structures 65 and 60 of the plate electrodes 54 and 55 may be formed in at least a portion of a boundary between the plate electrodes 54 and 55 and at least one of the plurality of first and second fine branch electrodes 57 and 59. For example, the partial extension structure 65 of the plate electrodes 54 and 55 may be formed in at least a portion of a boundary between the plate electrodes 54 and 55 and the plurality of first fine branch electrodes 57. Also, the partial extension structure 60 of the plate electrodes 54 and 55 may be formed in at least a portion of a boundary between the plates 54 and 55 and the plurality of second fine branch electrodes 59. FIGS. 2 through 4 illustrate as an example that the partial extension structures 65 and 60 of the plate electrodes 54 and 55 are respectively formed in at least a portion of a boundary between the plate electrodes 54 and 55 and the plurality of first fine branch electrodes 57 and in at least a portion of a boundary between the plates 54 and 55 and the plurality of second fine branch electrodes 59. The partial extension structures 65 and 60 of the plate electrodes 54 and 55 may be formed by partially extending the plate electrodes 54 and 55 in a shape of a stepping stone as shown in the partial enlarged view of FIG. 3. In this case, at least one of the slits 56 and 58 may be disposed between areas where the plate electrodes 54 and 55 are partially extended in a shape of a stepping stone. FIGS. 2 through 4 illustrate as an example that the partial extension structures 65 and 60 of the plate electrodes 54 and 55 are formed over the portions where the plurality of first and second fine branch electrodes 57 and 59 are formed. The partial extension structures 65 and 60 of the plate electrodes 54 and 55 may be formed in areas where lengths of the plurality of first and second fine branch electrodes 57 and 59 are maximized, that is, the inside/outside of centers of sides of a trapezoidal portion of the plate electrodes 54 and 55. The plate electrodes 54 and 55 may be partially extended in a shape of a stepping stone in the areas where the lengths of the plurality of first and second fine branch electrodes 57 and 59 are maximized.

For example, the plurality of first and second fine branch electrodes 57 and 59 may be formed to have lengths equal to or less than about 30 μm. In this case, the partial extension structures 65 and 60 of the plate electrodes 54 and 55 may be formed in a shape of a stepping stone in areas where lengths of the plurality of first and second fine branch electrodes 57 and 59 exceed, for example, about 29 μm. In this case, the partial extension structures 65 and 60 of the plate electrodes 54 and 55 may be formed to have sizes equal to or less than 5 μm.

When the pixel electrode 50 is formed to include the plate electrodes 54 and 55 and the plurality of first and second fine branch electrodes 57 and 59 as described above, the LCD device may have a high aperture ratio. In this case, in order to have a high aperture ratio and secure high liquid crystal control, a liquid crystal control length needs to be increased. In order to secure the liquid crystal control length, lengths of the plate electrodes 54 and 55 and the first and second fine branch electrodes 57 and 59 may be increased. Once the lengths of the plate electrodes 54 and 55 and the first and second fine branch electrodes 57 and 59 are increased, a response time of the liquid crystals 21 may be delayed and thus it may be difficult to use a method of increasing the lengths of the plate electrodes 54 and 55 and the first and second fine branch electrodes 57 and 59. Accordingly, it is necessary to increase a liquid crystal control length without delaying a response time of the liquid crystals 21. Since the plate electrodes 54 and 55 are partially extended in a shape of a stepping stone in at least a portion of a boundary between the first and second fine branch electrodes 57 and 59 and the plate electrodes 54 and 55, for example, in an area where lengths of the first and second fine branch electrodes 57 and 59 are maximized, a liquid crystal control length may be increased without delaying a response time. That is, since the plate electrodes 54 and 55 are partially extended in a shape of a stepping stone, a fringe field may be additionally formed between an area where the plate electrodes 54 and 55 are partially extended in a shape of a stepping stone and an adjacent slit area, and thus a liquid crystal control length is increased without delaying a response time. Hence, when the partial extension structures 65 and 60 of the plate electrodes 54 and 55 are used, a liquid crystal control length may be increased without delaying a response time, and since parts of the first and second fine branch electrodes 57 and 59 are replaced with the plate electrodes 54 and 55, a transmittance may be increased.

Referring to FIGS. 2 and 5, the common electrode 70 may include slit patterns 71 that are formed to have widths less than those of the plate electrodes 54 and 55 at positions corresponding to the plate electrodes 54 and 55 of the pixel electrode 50. The slit patterns 71 may be formed to surround the plurality of first fine branch electrodes 57 and portions of the cross patterns 53 including a point at which the horizontal slit 53a and the first vertical slits 53b cross each other. Accordingly, the plurality of the slit patterns 71 may be formed in the common electrode 70, and inner electrode portions of the slit patterns 71 may be formed to have substantially trapezoidal shapes.

In this case, the slit patterns 71 may be formed so that a distance between each of the slit patterns 71 and the boundary between the plate electrodes 54 and 55 and the plurality of first and second fine branch electrodes 57 and 59 ranges from about 15 µm to about 30 µm. In this case, the slit pattern 71 may be formed to have one or more portions having different widths.

The common electrode 70 includes a common electrode portion 73 having a substantially trapezoidal shape that is disposed at a center of the slit pattern 71 having a trapezoidal shape with widths and a common electrode portion 75 that is disposed outside the slit pattern 71.

Figure 6:
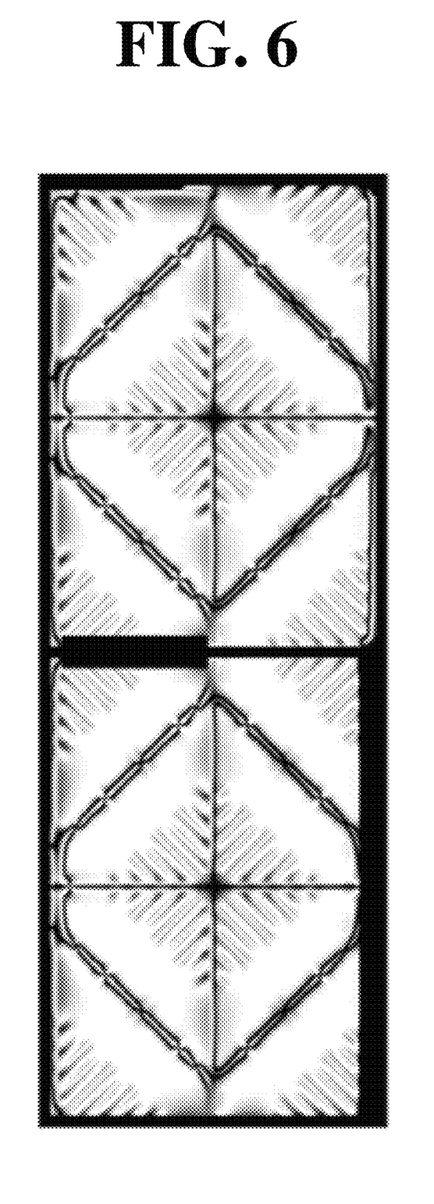
FIG. 6 is an image illustrating a light transmission state in the electrode structure of the LCD of FIG. 1.

FIG. 6 is an image illustrating a light transmission state in the electrode structure of the LCD device of FIG. 1.

As shown in the image of FIG. 6, in the LCD device of the present embodiment, since the first subpixel area 51 and the second subpixel area 52 are vertically arranged to have horizontally long shapes, an aperture ratio may be increased and thus a transmittance may be greatly increased. That is, since the first subpixel area 51 and the second subpixel area 52 that form one pixel area are vertically arranged to have horizontally long shapes, since a switching driver does not need to be disposed between the first subpixel area 51 and the second subpixel area 52 and may be disposed on a side surface of the first subpixel area 51 and the second subpixel area 52, an aperture ratio may be increased and thus a transmittance may be increased.

Also, since electrical connection may be realized on the side surface of the first subpixel area 51 and the second subpixel area 52, connection wiring may be minimized and thus textures may be minimized.

Although embodiments, in which the pixel electrode 50 includes the partial extension structures 65 and 60 of the plate electrodes 54 and 55, have been described above with reference ton FIGS. 2 through 6, the pixel electrode 50 of the LCD device of the present embodiment may not include the partial extension structures 65 and 60 of the plate electrodes 54 and 55.

Figure 7:
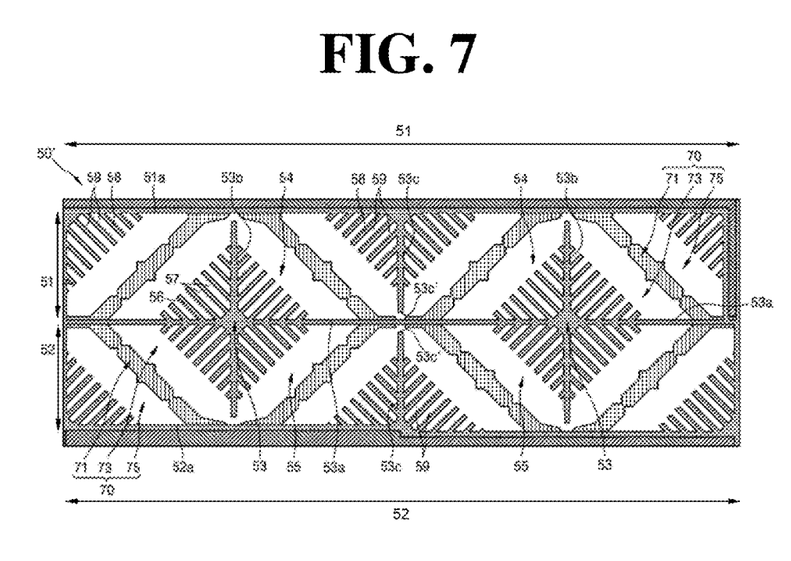
FIG. 7 is a view illustrating an electrode structure of the LCD device, according to another embodiment of the present invention.

FIG. 7 is a view illustrating a pixel structure of the LCD device, according to another embodiment of the present invention. When the pixel structure of FIG. 7 is compared with the pixel structure of FIG. 2, a pixel electrode 50' is the same as the pixel electrode 50 of FIG. 2 except that the pixel electrode 50' does not include the partial extension structures 65 and 60 of the plate electrodes 54 and 55.

In the LCD device using a horizontal pixel structure according to the present embodiment, since the first subpixel area 51 and the second subpixel area 52 that form one pixel area are divided by the horizontal slit 53 and are vertically arranged and a switching driver may be disposed on side surface of the first subpixel area 51 and the second subpixel area 52, connection wiring may be simplified, and since the switching driver does not need to be disposed between the first subpixel area 51 and the second subpixel area 52, an aperture ratio may be increased.

In the LCD device according to the present embodiment, since a transmittance may be changed by applying different voltages to the first subpixel area 51 and the second subpixel area 52, side visibility may be improved to be close to front visibility. Also, since the first subpixel area 51 and the second subpixel area 52 are vertically arranged to have horizontally long shapes, an area ratio for adjusting characteristics such as visibility maybe easily changed.

As described above, according to the one or more of the above embodiments of the present invention, since a first subpixel area and a second subpixel area that constitute one pixel area are vertically arranged to have horizontally long shapes, an aperture ratio may be increased and thus a transmittance may also be increased.

Also, since electrical connection may be formed on side surface of the first subpixel area and the second subpixel area, connection wiring may be minimized and textures may be minimized. Also, since the first subpixel area and the second subpixel area are vertically arranged to have horizontally long shapes, an area ratio for adjusting characteristics such as visibility may be easily changed.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:
1. A liquid-crystal display (LCD) device, comprising:
one pair of substrates; and
a pixel electrode and a common electrode that are provided on the one pair of substrates to respectively face each other,
wherein the pixel electrode comprises:
one pair of plate electrodes in which a horizontal slit and a plurality of first vertical slits that cross the horizontal slit are formed and that are divided by the horizontal slit and surround both sides of a cross pattern formed by the horizontal slit and the first vertical slit; and
a plurality of fine branch electrodes that are obliquely formed to be connected to the plate electrode at a portion of the cross pattern including a point at which the horizontal slit and the first vertical slit cross each other,
wherein one pixel region comprises a first subpixel area and a second subpixel area that are divided by the horizontal slit.

2. The LCD device, of claim 1, further comprising:
a plurality of second vertical slits that extend from edges of the pixel region along the horizontal slit alternate with the plurality of first vertical slits; and
a plurality of second fine branch electrodes that are obliquely formed to be connected to the plate electrode at a portion including a point at which the edges of the pixel region and the second vertical slit meet each other.

3. The LCD device, of claim 2, wherein an end of the second vertical slit are departed from the horizontal slit so that portions of the plate electrode that respectively belong to the first subpixel area and the second subpixel area are connected to each other.

4. The LCD device, of claim 2, wherein a partial extension structure of the plate electrode is formed in at least a portion of a boundary between the plate electrode and at least one of the plurality of first fine branch electrodes and the plurality of second fine branch electrodes.

5. The LCD device, of claim 1, wherein a partial extension structure of the plate electrode is formed in at least a portion of a boundary between the plate electrode and the plurality of first fine branch electrodes.

6. The LCD device, of claim 5, wherein the partial extension structure of the plate electrode is formed by partially extending the plate electrode in a shape of a stepping stone.

7. The LCD device, of claim 6, wherein one or more slits are formed in at least one area where the plate electrode is partially extended in the shape of the stepping stone.

8. The LCD device, of claim 4, wherein the partial extension structure of the plate electrode is formed by partially extending the plate electrode in a shape of a stepping stone.

9. The LCD device, of claim 8, wherein one or more slits are formed in at least one area where the plate electrode is partially extended in the shape of the stepping stone.

10. The LCD device, of claim 1, wherein the common electrode comprises a slit pattern that is formed to have a width less than a width of the plate electrode at a position corresponding to the plate electrode.

11. The LCD device, of claim 10, wherein the slit pattern is formed to surround the plurality of first fine branch electrodes and portion of the cross pattern including a point at which the horizontal slit and the first vertical slit cross each other.

12. The LCD device, of claim 10, wherein the slit pattern is formed so that inner electrode portion of the slit pattern have trapezoidal shape.

13. The LCD device, of claim 10, wherein the slit pattern is formed to have a portion having different width.

* * * * *